(12) United States Patent
Chen

(10) Patent No.: US 8,087,739 B2
(45) Date of Patent: Jan. 3, 2012

(54) DRAWING CASE FOR ELECTRONIC INFORMATION STORAGE MEDIUM

(75) Inventor: Wen-Ping Chen, Taipei (TW)

(73) Assignee: Abertek Company Limited, Taipei County (TW)

( * ) Notice: Subject to any disclaimer, the term of this patent is extended or adjusted under 35 U.S.C. 154(b) by 178 days.

(21) Appl. No.: 12/566,694

(22) Filed: Sep. 25, 2009

(65) Prior Publication Data

US 2011/0074259 A1    Mar. 31, 2011

(51) Int. Cl.
*A47B 95/02* (2006.01)

(52) U.S. Cl. ............. 312/332.1; 312/223.2; 361/679.37; 361/727; 70/379 R

(58) Field of Classification Search ............... 312/330.1, 312/332.1, 223.1, 223.2, 348.6; 70/379 R, 70/380, DIG. 20; 361/679.33–679.39
See application file for complete search history.

(56) References Cited

U.S. PATENT DOCUMENTS

| | | | | |
|---|---|---|---|---|
| 1,951,418 A * | 3/1934 | Jacobi | | 70/360 |
| 1,979,938 A * | 11/1934 | Jacobi | | 70/369 |
| 4,941,841 A * | 7/1990 | Darden et al. | | 361/679.39 |
| 5,797,667 A * | 8/1998 | Wu | | 312/332.1 |
| 6,193,339 B1 * | 2/2001 | Behl et al. | | 312/223.2 |
| 6,378,965 B1 * | 4/2002 | Reznikov et al. | | 312/332.1 |
| 6,717,816 B1 * | 4/2004 | Tanaka et al. | | 361/728 |
| 6,952,342 B1 * | 10/2005 | Chen | | 361/679.38 |
| 7,050,297 B2 * | 5/2006 | Chung | | 361/679.35 |
| 7,256,989 B2 * | 8/2007 | Liu et al. | | 361/679.33 |
| 7,480,137 B1 * | 1/2009 | Jyh | | 361/679.33 |
| 7,511,953 B2 * | 3/2009 | Tao et al. | | 361/679.39 |
| 7,848,099 B1 * | 12/2010 | Zhang et al. | | 361/679.38 |
| 2002/0101708 A1 * | 8/2002 | Cheng | | 361/685 |
| 2003/0174464 A1 * | 9/2003 | Funawatari et al. | | 361/685 |
| 2004/0032711 A1 * | 2/2004 | Kaczeus et al. | | 361/685 |
| 2005/0066346 A1 * | 3/2005 | Wang et al. | | 720/657 |
| 2005/0207108 A1 * | 9/2005 | Chen | | 361/685 |
| 2007/0205702 A1 * | 9/2007 | Hsu | | 312/9.1 |
| 2007/0230107 A1 * | 10/2007 | Hsu et al. | | 361/685 |
| 2008/0055841 A1 * | 3/2008 | Tao et al. | | 361/685 |
| 2009/0016012 A1 * | 1/2009 | Huang | | 361/685 |

* cited by examiner

*Primary Examiner* — Darnell Jayne
*Assistant Examiner* — Kimberley S Wright
(74) *Attorney, Agent, or Firm* — Leong C. Lei

(57) ABSTRACT

A drawing case for an electronic information storage medium comprises a case body; a panel including a holder, a locking tool slot, a first through hole and a plurality of heat dissipation holes; a locking tool mounted in the locking tool slot and connected to an engaging piece that is provided with a first resilient element; a handle including a hook, one end of the handle being pivotally disposed on the holder, wherein the hook passes through the first through hole and engages with the engaging piece and is propped against the first resilient element. In this manner, the purpose of ease of drawing can be achieved by pressing the locking tool to open the handle, thereby not only significantly reducing manufacturing costs and assembly/disassembly complexity, such as eliminating the use of screws, but also enhancing the heat dissipation efficiency.

4 Claims, 6 Drawing Sheets

DRAWING CASE FOR ELECTRONIC INFORMATION STORAGE MEDIUM

BACKGROUND OF THE INVENTION (a) Field of the Invention

The present invention relates to a drawing case for an electronic information storage medium, and more particularly to those which are applied to the technical field of personal computers or industrial computers.

(b) Description of the Prior Art

As science and technology change with each passing day, the development of computers is progressing toward strong operation functions, high speed and compactness. In order to meet strong operational requirements of computers, many electronic information storage media, such as a hard disk drive, a floppy disk drive, a disk drive, an optical disk drive, a card reader, a magnetic tape drive, a device having a storage interface, and/or the like are usually installed in a computer. For the convenience of assembly and disassembly of the storage medium, the storage medium is often previously installed in a drawing mechanism (e.g. a drawing case), and then the drawing mechanism is inserted into the corresponding mechanism of the computer mainframe to achieve the purpose of ease of assembly and disassembly.

Nowadays, a drawing case for a hard disk drive is a popularly used drawing mechanism. It provides convenience to the user who needs to frequently change hard disk drives, or transfer data between different workplaces, or use multiple operating systems, etc. The user can easily change a hard disk drive without the need for time consuming and laborious disassembly of a computer mainframe case. However, because the hard disk drive is placed in a case body, it is not easy to dissipate the heat generated during operation of the hard disk drive after the hard disk drive has been inserted into the computer mainframe. Accordingly, the increased operating temperature will significantly shorten its service life and lifetime, as well as affect the operating temperature and service life of other electronic components, leading to increased failure rate and thus relatively increasing maintenance and replacement costs. Therefore, a plurality of heat dissipation holes are designed on the case body or the panel of the case body of a drawing case for a hard disk drive of the prior art to dissipate hot air generated during operation of the hard disk drive. One or more heat dissipating fans are further mounted to enhance the heat dissipation effect of the heat dissipation holes.

Referring to FIG. 1, there is illustrated a drawing and fixing mechanism for a hard disk drive according to the prior art of R.O.C. Pat. No. 539206. The mechanism is substantially a panel structure and comprised of a body 1, a locking tool 10, a pressing catch 11, an outside cover plate 13, an inside cover plate 15, and two resilient elements 12, 14. The outside cover plate 13 covers the inside cover plate 15. One end of the outside cover plate is pivotally connected with one end of the inside cover plate. The two cover plates have thereon a plurality of air holes for heat dissipation. The outside cover plate 13 is controlled by the pressing catch 11. After the pressing catch 11 is pressed, the other end of the outside cover plate 13 is ejected outwardly. The ejected outside cover plate 13 can serve as a draw bar so that the hard disk drive can be successfully drawn out of the computer mainframe. However, the pressing catch 11 is required to control the actuation of the outside cover plate 13 in the prior art. In addition to the pressing catch 11, many elements (e.g. the resilient element 12) are also required to achieve the effect of controlling the outside cover plate 13. This raises manufacturing costs and complexity. The pressing catch 11 thus arranged occupies the area on the inside cover plate 15 for the arrangement of air holes, thereby affecting the heat dissipation efficiency.

In view of many problems and deficiencies existing in the above-mentioned prior art, the inventors have devoted in research and improvement based on many years of experience and technology in the related industry to develop a drawing case for an electronic information storage medium according to the present invention. By means of the design of an engaging piece connected to a locking tool, the purpose of ease of drawing the drawing case can be achieved by pressing the locking tool to easily open the handle. This can eliminate the use of screws and can provide larger heat dissipation area to enhance the heat dissipation efficiency.

SUMMARY OF THE INVENTION

An object of the present invention aims to provide a drawing case for an electronic information storage medium.

To achieve the foregoing object, a drawing case for an electronic information storage medium according to the present invention comprises a case body including a bottom wall, a front wall and two opposing side walls to form a space for accommodating the electronic information storage medium; a panel mounted on the front wall of the case body, including a holder, a locking tool slot, a first through hole and a plurality of heat dissipation holes; a locking tool mounted in the locking tool slot; an engaging piece connected to the locking tool; the engaging piece being provided with a first resilient element; and a handle including a hook, one end of the handle being pivotally disposed on the holder so that the handle is rotated between a first position near the panel to provide a close state and a second position away from the panel to provide an open state with respect to the panel, wherein the hook passes through the through hole to engage with the engaging piece and is propped against the first resilient element to provide the close state, and the engaging piece is actuated by pressing the locking tool and thus the hook is resiliently separated from the engaging piece to provide the open state.

In the above-mentioned drawing case, the front wall further has a second through hole and the locking tool includes: a lock provided at its front end with a key insertion portion and provided at its rear end with a catching portion, the catching portion being provided thereon with a groove; a lock provided at its front end with a key insertion portion and provided at its rear end with a catching portion that is provided thereon with a groove; a catching piece having a notch whose shape corresponds to the shape of the catching portion for accommodating the catching portion, wherein when the lock is pivotally rotated to a specific angle, the groove is caught so that the lock cannot be moved toward the axial direction; a tongue pivotally connected with the catching portion, having a propping portion for propping against the front wall, wherein when the lock is pivotally rotated to another specific angle, the propping portion passes through the second through hole; and a second resilient element disposed between the front wall and the tongue.

In the above-mentioned drawing case, each of the two opposing side walls of the case body is provided with one or more cushion pieces.

In the above-mentioned drawing case, the cushion pieces and the case body are formed as one piece.

In the above-mentioned drawing case, the cushion piece includes a plurality of cushion bodies.

In the above-mentioned drawing case, the cushion body is rubber.

The above-mentioned drawing case is suitable for an electronic device so that the electronic information storage medium is electrically connected to the electronic device for transmitting data.

In the above-mentioned drawing case, the electronic information storage medium is a hard disk drive, a floppy disk drive, a disk drive, an optical disk drive, a card reader, a magnetic tape drive, or a device having a storage interface.

In the above-mentioned drawing case, the electronic device is a computer or a disk array device.

In the above-mentioned drawing case, the case body is further provided with one or more heat dissipating fans.

DETAILED DESCRIPTION OF THE PREFERRED EMBODIMENTS

The contents of the present invention will become more apparent from the following description when taken in conjunction with the drawings.

Figure 1:
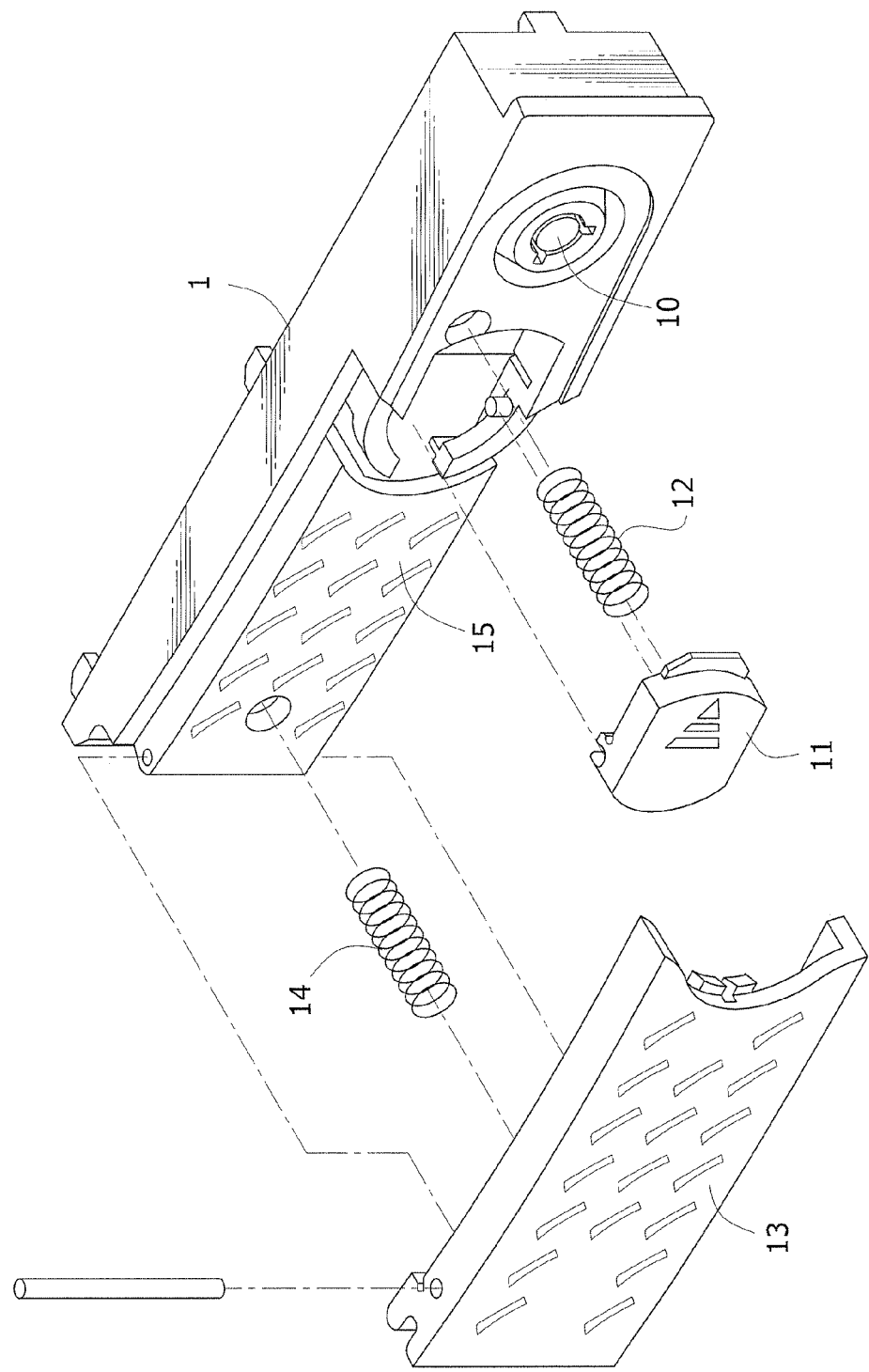
FIG. 1 is a three-dimensional exploded view of the prior art.
Figure 2A:
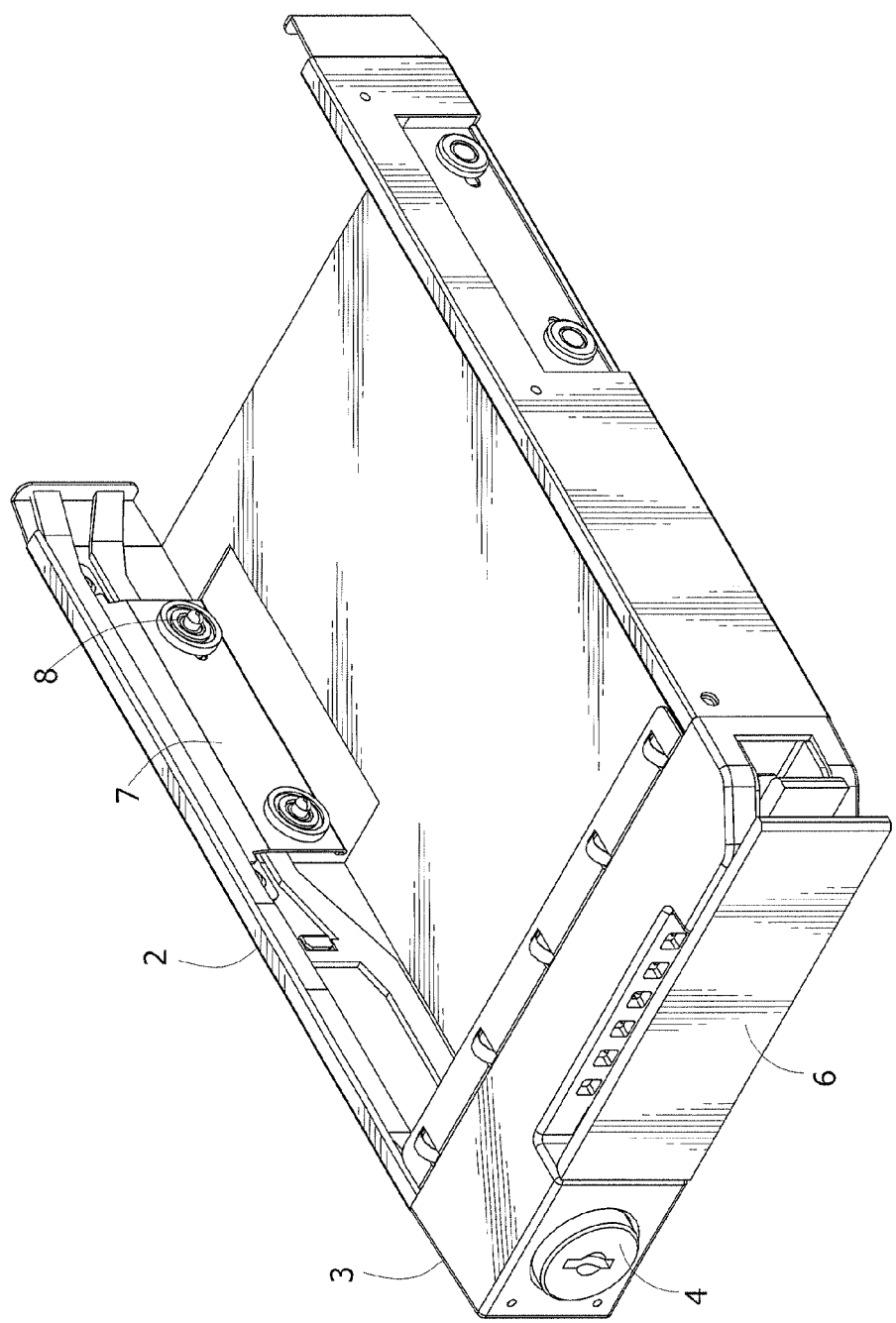
FIG. 2A is a three-dimensional view of the front side of a preferred embodiment of the present invention.
Figure 2B:
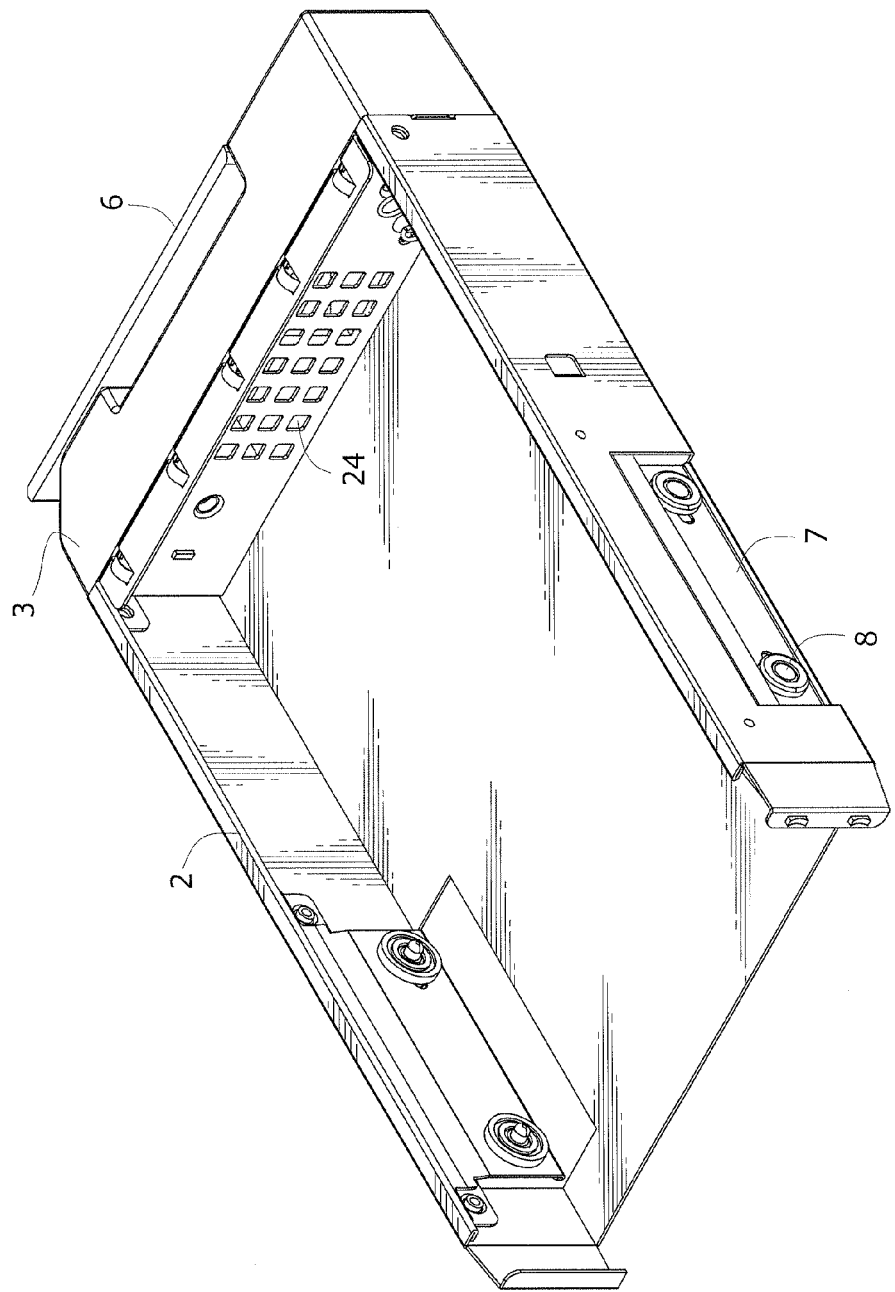
FIG. 2B is a three-dimensional view of the rear side of a preferred embodiment of the present invention.
Figure 3:
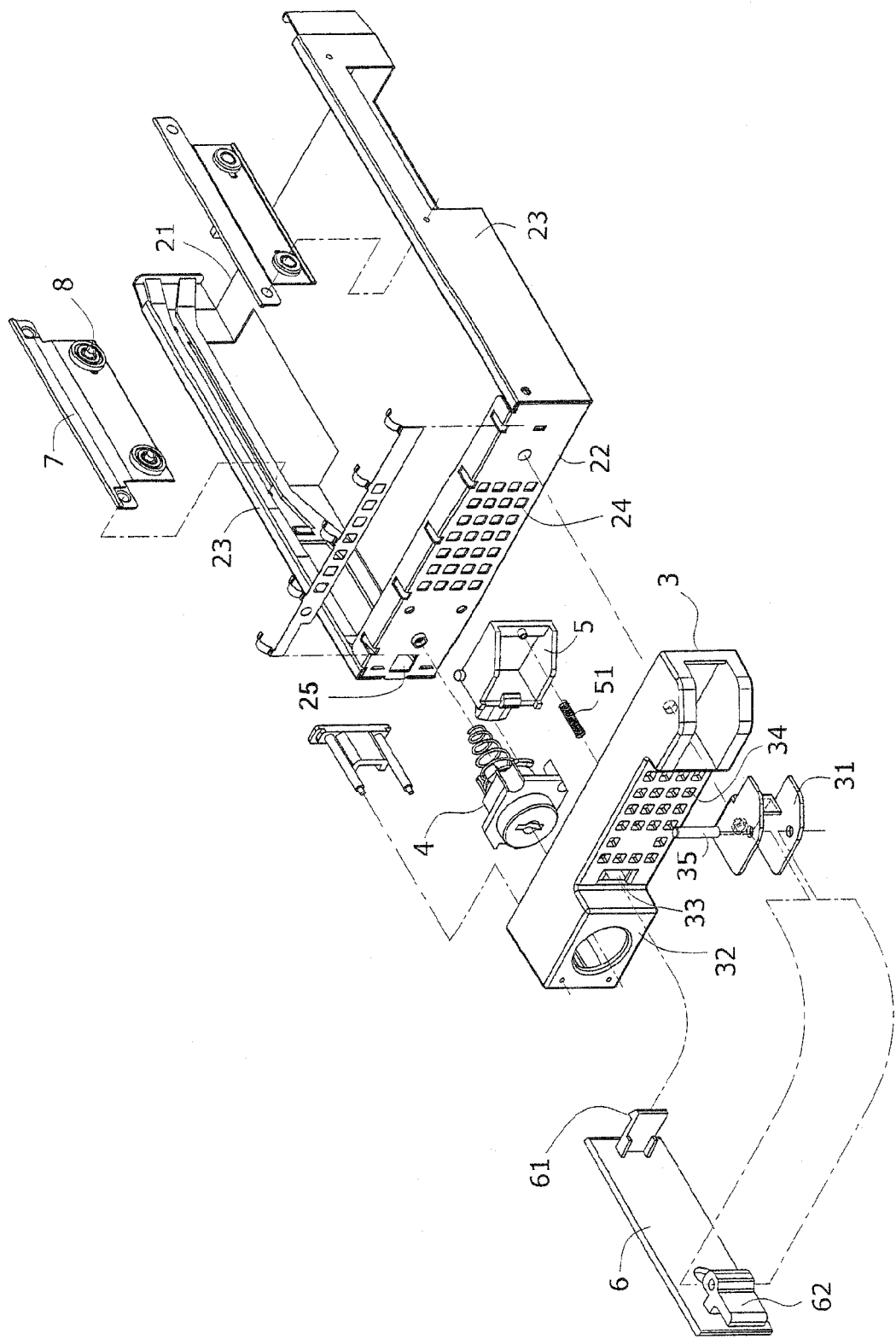
FIG. 3 is a three-dimensional exploded view of a preferred embodiment of the present invention.

Referring to FIGS. 2A, 2B and 3, FIG. 2A is a three-dimensional view of the front side of a preferred embodiment of the present invention; FIG. 2B is a three-dimensional view of the rear side of a preferred embodiment of the present invention; FIG. 3 is a three-dimensional exploded view of a preferred embodiment of the present invention. As illustrated in these figures, a drawing case for an electronic information storage medium according to the present invention comprises a case body 2, a panel 3, a locking tool 4, an engaging piece 5, a handle 6, two cushion pieces 7, and four cushion bodies 8.

The case body 2 includes a bottom wall 21, a front wall 22 and two opposing side walls 23 to form a space for accommodating the electronic information storage medium. The front wall 22 can be formed as one piece with other portions of the case body 2, or can be easily assembled into or separated from the case body 2. The front wall 22 is provided thereon with a plurality of heat dissipation holes 24 and a second through hole 25. The case body 2 is preferably made of metal, such as aluminum alloy, magnesium alloy or aluminium magnesium alloy, etc. The electronic information storage medium is a hard disk drive, a floppy disk drive, a disk drive, an optical disk drive, a card reader, a magnetic tape drive, or a device having a storage interface, which is suitable for an electronic device, so that the electronic information storage medium is electrically connected to the electronic device (a computer or a disk array device) for transmitting data.

The panel 3 is mounted on the front wall 22 of the case body 2, and includes a holder 31, a locking tool slot 32, a first through hole 33, and a plurality of heat dissipation holes 34. The panel 3 is made of plastics or metal, and is preferably made of plastics by injection molding. The holder 31 can be formed as one piece with the panel 3, or can be easily assembled into or separated from the panel 3.

The locking tool 4 is mounted in the locking tool slot 32 and connected to an engaging piece 5 that is provided with a first resilient element 51. The engaging piece 5 is directly fixed at the locking tool 4, or can be easily assembled onto or separated from the locking tool 4. The engaging piece 5 is made of plastics or metal, and is preferably made of plastics by injection molding. The locking tool 4 can be cooperated with a key to open or lock the drawing case. When in the locked state, the drawing case and an electronic device cannot be separated with respect to each other. They can be separated only when in the open state.

The handle 6 includes a hook 61. One end of the handle 6 is pivotally disposed on the holder 31. Preferably, a connecting body 62 is disposed on the handle 6 to engage with a pivot shaft 35 on the holder 31. Due to the pivoting structure, the handle 6 is rotated between a first position near the panel 3 to provide a close state and a second position away from the panel 3 to provide an open state with respect to the panel 3. The hook 61 can pass through the first through hole 33 and engages with the engaging piece 5 and is propped against the first resilient element 51 to provide the close state. The engaging piece 5 is actuated backward by pressing the locking tool 4 and thus the hook 61 is resiliently separated from the engaging piece 5 by means of an applied resilient force provided by the first resilient element 51 against which the handle 6 is propped, to provide the open state. The handle 6 is made of plastics or metal, and is preferably made of plastics by injection molding.

In the drawing case, each of the two opposing side walls 23 of the case body 2 can be further provided with one or more cushion pieces 7. The cushion pieces 7 can be formed as one piece with the case body 2, or can be easily assembled onto or separated from the case body 2. The cushion pieces 7 can absorb the vibration during operation of the electronic information storage medium to prevent damage from vibration. Particularly, the assembly tolerance between the drawing case and the mounting bracket of the electronic device during the period when they are assembled and fixed to each other will cause greater vibration. The cushion piece 7 further includes thereon a plurality of cushion bodies 8. The cushion bodies 8 are made of rubber and more easily to absorb the vibration during operation of the electronic information storage medium.

In the drawing case, the case body 2 can be further provided with one or more heat dissipating fans to enhance the heat dissipation effect of the heat dissipation holes 34. The heat dissipating fans are preferably mounted on the front wall 22 or the bottom wall 21.

Figure 4:
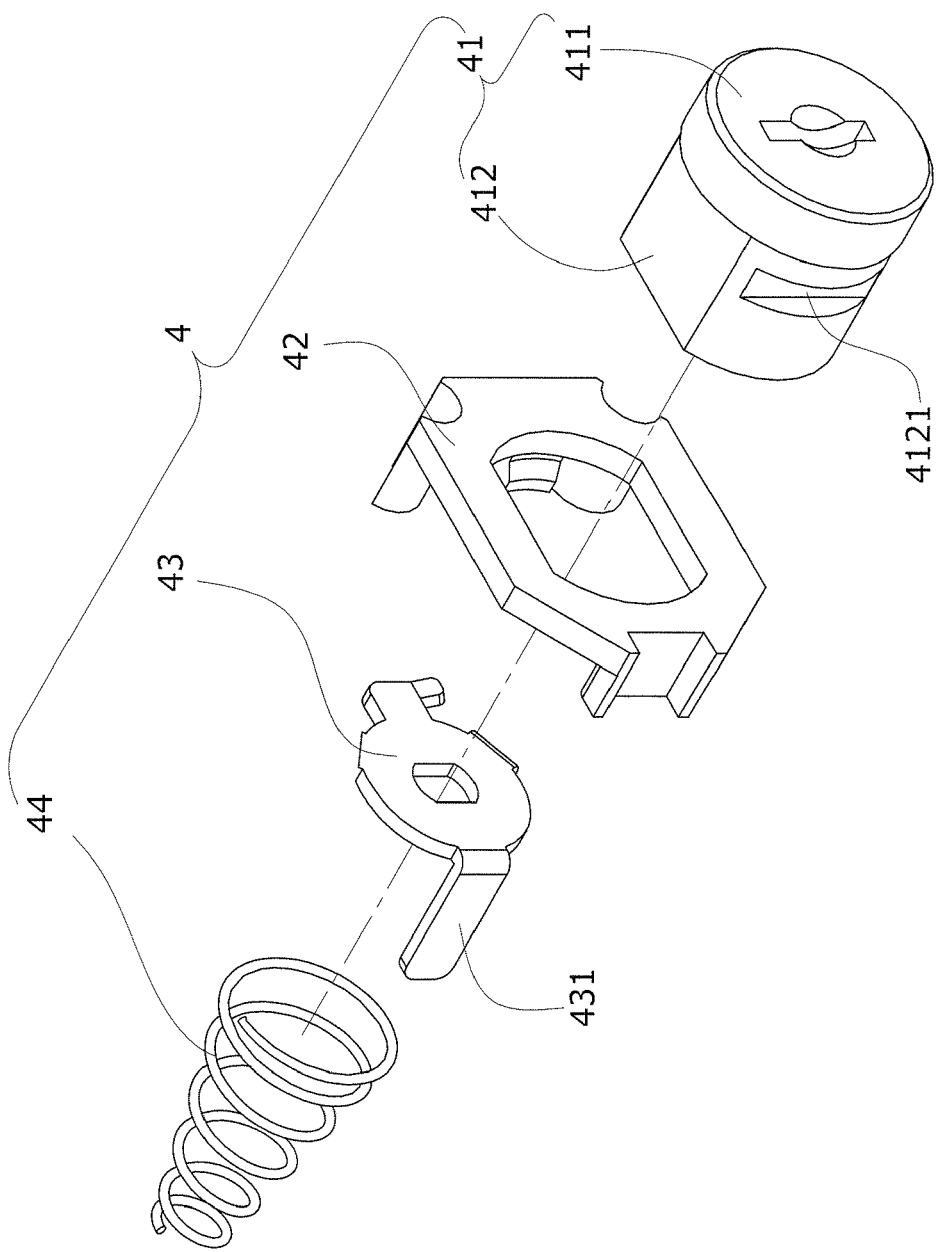
FIG. 4 is a three-dimensional exploded view of a locking tool according to a preferred embodiment of the present invention.

Next, referring to FIG. 4, it illustrates a three-dimensional exploded view of a locking tool according to a preferred embodiment of the present invention. As illustrated in this figure, the locking tool 4 includes a lock 41, a catching piece 42, a tongue 43, and a second resilient element 44.

The lock 41 is provided at its front end with a key insertion portion 411 for the insertion of a key. The key insertion portion 411 is turned by the key to open or close the locking tool 4. The lock 41 is provided at its rear end with a catching portion 412 which rotates with the key insertion portion 411. The catching portion 412 is provided thereon with at least one groove 4121.

The catching piece 42 has a notch whose shape corresponds to the shape of the catching portion 412 for accommodating the catching portion 412 so that the lock 41 can be turned within the catching piece 42. When the lock 41 is pivotally rotated to a specific angle, the groove 4121 is caught so that the lock 41 cannot be moved toward the axial direction.

The tongue 43 is pivotally connected and rotates with the catching portion 412. The tongue 43 has a propping portion 431 for propping against the front wall 22. When the lock is pivotally rotated to another specific angle, the propping portion 431 can pass through the second through hole 25 so that the lock 41 can be moved toward the axial direction and thus the engaging piece 5 is actuated to open the handle 6.

The second resilient element 44 is disposed between the front wall 22 and the tongue 43 to provide a resilient force that allows the lock 41 to return to its initial position.

Figure 5:
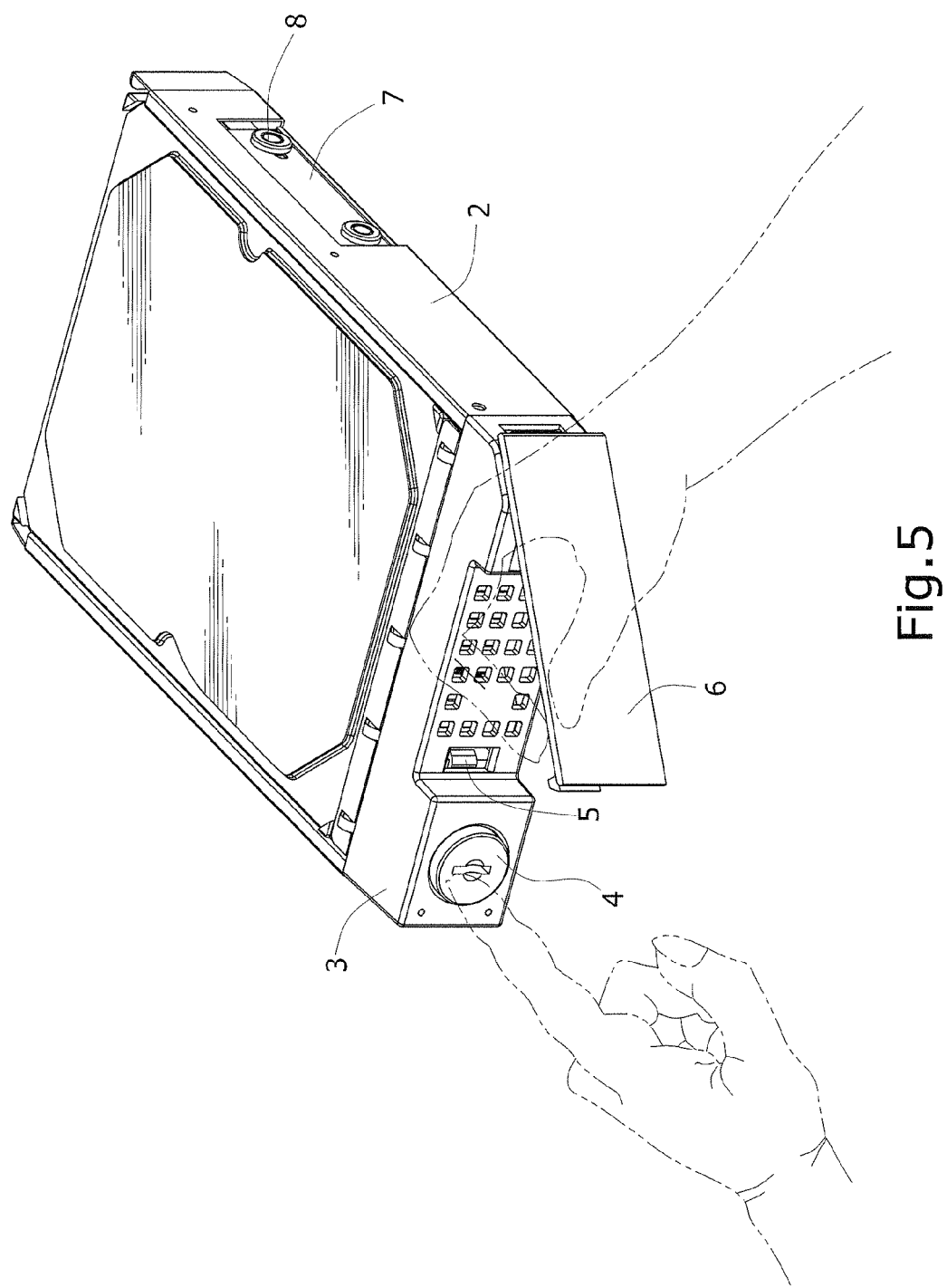
FIG. 5 is a schematic view showing the action of a preferred embodiment of the present invention.

FIG. 5 is a schematic view showing the action of a preferred embodiment of the present invention. When the locking tool 4 is rotated to an angle, the user can open the handle 6 by pressing the locking tool 4, and then holds the handle and pulls out the drawing case.

As described above, the present invention has the following advantages in practice:

1. Different from the prior art, it is unnecessary for the present invention to use a pressing catch. The locking tool of the drawing case can be easily pressed to achieve the purpose of ease of opening the handle only by means of the design of the engaging piece connected to the locking tool. This can significantly reduce manufacturing costs and complexity.

2. Since it is unnecessary for the present invention to use a pressing catch of the prior art, the area of the heat dissipation holes on the panel can be significantly increased and the heat dissipation efficiency can also be significantly enhanced.

3. By means of the structural design of the present invention, the drawing case can be securely locked in a computer mainframe without the aid of screws. Moreover, the drawing case cannot be pulled out of the computer mainframe by force because the locking tool slot is tightly fitted with the handle.

What are described above are only preferred embodiments of the invention and should not be used to limit the claims of the present invention, and all other alterations fall within the scope of the present invention; the above description can be understood and put into practice by those skilled in the art, and therefore any simple or equivalent changes and modifications made without departing from the spirit and scope of the present invention should be included in the appended claims.

In summarization of the foregoing description, a drawing case for an electronic information storage medium according to the present invention has novelty, inventiveness and industrial applicability, and the application for a utility patent is duly filed accordingly.

What is claimed is:

1. A drawing case for an electronic information storage medium, comprising:

a case body including a bottom wall, a front wall and two opposing side walls to form a space for accommodating the electronic information storage medium;

a panel mounted on the front wall of the case body, including a holder, a locking tool slot, a first through hole, a second through hole and a plurality of heat dissipation holes;

a locking tool mounted in the locking tool slot;

an engaging piece connected to the locking tool, the engaging piece being provided with a first resilient element; and a handle including a hook, one end of the handle being pivotally disposed on the holder so that the handle is rotated between a first position near the panel to provide a close state and a second position away from the panel to provide an open state with respect to the panel, wherein the hook passes through the first through hole to engage with the engaging piece and is propped against the first resilient element to provide the close state, and the engaging piece is actuated by pressing the locking tool and thus the hook is resiliently separated from the engaging piece to provide the open state;

the locking tool includes:

a lock provided at its front end with a key insertion portion and provided at its rear end with a catching portion, the catching portion being provided thereon with a groove;

a catching piece having a notch whose shape corresponds to the shape of the catching portion for accommodating the catching portion, wherein when the lock is pivotally rotated to a specific angle, the groove is caught so that the lock cannot be moved toward the axial direction;

a tongue pivotally connected with the catching portion, having a propping portion for propping against the front wall, wherein when the lock is pivotally rotated to another specific angle, the propping portion passes through the second through hole; and a second resilient element disposed between the front wall and the tongue.

2. The drawing case for an electronic information storage medium as claimed in claim 1, wherein each of the two opposing side walls of the case body is provided with one or more cushion pieces.

3. The drawing case for an electronic information storage medium as claimed in claim 2, wherein the cushion pieces and the case body are formed as one piece.

4. The drawing case for an electronic information storage medium as claimed in claim 2, wherein the cushion piece includes a plurality of cushion bodies.

* * * * *